United States Patent
Mishra

(10) Patent No.: US 11,962,499 B2
(45) Date of Patent: Apr. 16, 2024

(54) MULTITENANCY FOR SERVICE MACHINES

(71) Applicant: VMware LLC, Palo Alto, CA (US)

(72) Inventor: Rahul Mishra, Mountain View, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 16/176,383

(22) Filed: Oct. 31, 2018

(65) Prior Publication Data
US 2020/0136966 A1 Apr. 30, 2020

(51) Int. Cl.
*H04L 45/74* (2022.01)
*G06F 9/455* (2018.01)
*H04L 69/22* (2022.01)

(52) U.S. Cl.
CPC .......... *H04L 45/74* (2013.01); *G06F 9/45558* (2013.01); *H04L 69/22* (2013.01); *G06F 2009/45595* (2013.01); *H04L 2212/00* (2013.01)

(58) Field of Classification Search
CPC ..... H04L 45/74; H04L 69/22; H04L 2212/00; H04L 67/63; G06F 9/45558; G06F 2009/45595
See application file for complete search history.

(56) References Cited

U.S. PATENT DOCUMENTS

| | | | |
|---|---|---|---|
| 9,686,192 B2 | 6/2017 | Sengupta et al. | |
| 9,819,452 B2 * | 11/2017 | Birrittella | H04L 1/1657 |
| 2005/0097358 A1 * | 5/2005 | Yanovsky | H04L 63/0281 713/153 |

(Continued)

OTHER PUBLICATIONS

Hosken, Martin, VMwarevCloud, "VMware vCenter Server—Vmware Provider Use Cases and Architectures", Version 2.9 dated Jan. 2018, 38 pages.

*Primary Examiner* — Jianye Wu

(74) *Attorney, Agent, or Firm* — King Intellectual Asset Management

(57) ABSTRACT

In an embodiment, a computer-implemented method for enabling multitenancy for service machines is disclosed. In an embodiment, the method comprises detecting a packet by a service insertion module implemented in a hypervisor. Based on metadata received along with the packet, the service insertion module determines a tenant identifier of a tenant that sent the packet. The service insertion module also determines a plurality of attributes of the packet. Based on the tenant identifier and the plurality of attributes of the packet, an action for the packet is retrieved from a rule table. Based on the action, the service insertion module determines whether at least one service is to be applied to the packet. In response to determining that at least one service is to be applied to the packet, an encapsulated packet is generated by encapsulating the packet with the tenant identifier, and the encapsulated packet is redirected to a service machine that is configured to provide the at least one service to the packet. Upon receiving a result from the service machine, the service insertion module determines, based on the result, whether to forward the packet toward a packet destination; and in response to determining that the packet is to be forwarded toward the packet destination, the packet is forwarded toward the packet destination.

20 Claims, 5 Drawing Sheets

(56) References Cited

U.S. PATENT DOCUMENTS

2007/0223372 A1* 9/2007 Haalen ................... H04L 47/20
370/229
2016/0191361 A1* 6/2016 Behera ................... H04L 43/20
709/224
2018/0159957 A1* 6/2018 Hooda ................... H04L 67/63

* cited by examiner

270 Per-Tenant Rule Table

| 272 T1 | 273 Rule (Src IP1, Src Port1, Dst IP2, Dst Port2, Prot1 →Forward to Service) |
| | 274 Rule (Src IP2, Src Port1, Dst IP3, Dst Port2, Prot2 → Allow) |
| | ... |
| 276 T2 | 277 Rule (Src IP3, Src Port1, Dst IP1, Dst Port2, Prot1 → Forward to Service) |
| | 278 Rule (Src IP4, Src Port1, Dst IP2, Dst Port2, Prot1 → Allow) |
| | ... |
| ... | ... |

290 Per [Tuple + Tenant] Rule Table

| 292 Rule (Src IP1, Src Port1, Dst IP1, Dst Port2, Prot1, T1 → Forward to Service) |
| --- |
| 293 Rule (Src IP2, Src Port2, Dst IP2, Dst Port2, Prot1, T2 → Allow) |
| 294 Rule (Src IP3, Src Port3, Dst IP1, Dst Port3, Prot1, T1 → Forward to Service) |
| 295 Rule (Src IP4, Src Port4, Dst IP2, Dst Port1, Prot2, T2 → Drop) |
| ... |

FIG. 2C

MULTITENANCY FOR SERVICE MACHINES

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Furthermore, it should not be assumed that any of the approaches described in this section are well-understood, routine, or conventional merely by virtue of their inclusion in this section.

In virtualization networks, software multitenancy refers to a software architecture in which a single instance of software serves multiple tenants. A tenant is a group of users, devices, or entities that share common access to the instance. In the multitenant architecture, a software application may be designed to provide every tenant a dedicated share of the instance, including data, configuration, and tenant individual functionalities. The multitenancy architecture is opposite to a multi-instance architecture in which each tenant is served by a separate software instance.

Although tenants may share the physical infrastructure of a virtualized datacenter, each tenant may have its own virtual compute, network resources, and storage resources. Traffic between the tenants is usually restricted, logically separated, and protected. Each tenant is securely separated from other tenants using techniques such as access control and VLAN segmentation.

In some situations, before a network data packet is forwarded toward its destination, the packet is processed by service functions, also referred to as services, provided by service machines. The services for the packet may be ordered in a sequence of services, also referred to as a chain of services. Examples of the services may include firewall services ("FS"), intrusion detection services ("IDS"), and intrusion prevention services ("IPS").

It is possible that packets received from different tenants may have the same attributes, such as a source address, a destination address, and a packet type, but may require different servicing, and thus should have associated different rules and different service chains. Unfortunately, typical service machines operate in a multi-instance architecture and a typical service machine provides services to one tenant, not to multiple tenants.

SUMMARY

In an embodiment of a proposed system, multitenancy for service machines is enabled in virtualized communications network. Examples of service machines include firewall service virtual machines and physical appliances that are configured to apply firewall-based rules to packets before the packets are routed toward their destinations, modified, or dropped. The techniques allow a single service machine to serve multiple tenants, and thus, multiple tenants may receive services from one service machine. The presented techniques improve over other approaches in which a single service machine can serve only one tenant, but not multiple tenants.

In an embodiment, multitenancy for service machines is enabled by using tenant identifiers and associating the identifiers with packets received from tenants. The tenant identifiers uniquely identify the tenants and are used to differentiate the packets received from different tenants.

A tenant identifier may be a numerical or alphanumerical code and may be determined for a tenant based on a port identifier of a port on which the packet was received from the tenant. A mapping between the tenant identifiers and the tenants may be captured in a property table that may be maintained by a virtual network interface card ("VNIC"), or other software or hardware component that receives the packets from the tenants. Contents of the property table may be provided by a software defined networking ("SDN") manager or any other software or hardware component configured to do so.

In an embodiment, a tenant identifier of a tenant that sent a packet is included in metadata added to the packet before the packet is detected by a forwarding element such as a virtual switch. The metadata associated with the packet may be used to distinguish the packet from other tenants' packets.

In an embodiment, a computer-implemented method for enabling multitenancy for service machines is performed by a service insertion module implemented in a hypervisor. The service insertion module may cooperate with a distributed virtual filter, which may be implemented in a VNIC, a port, or at any point between the VNIC and a virtual switch.

Once the packet is detected, the service insertion module determines, based on the metadata received along with the packet, a tenant identifier of a tenant that sent the packet. Furthermore, the service insertion module extracts a plurality of attributes of the packet, such as a source address, a destination address, and a protocol identifier of a communications protocol used to send the packet.

Based on the tenant identifier and the plurality of attributes, the service insertion module retrieves an action for the packet from a rule table. A rule table may be implemented in the service insertion module and initiated based on data provided by the SDN management and/or control planes. Examples of actions include: forward the packet to a service machine to provide a service to the packet, route the packet toward its destination, and drop the packet.

Based on the action, the service insertion module determines whether at least one service is to be applied to the packet. In response to determining that at least one service is to be applied to the packet, the service insertion module encapsulates the packet with the tenant identifier to create an encapsulated packet and redirects the encapsulated packet to a service machine that is configured to provide the at least one service to the packet.

Redirecting the encapsulated packet to a service machine may cause the service machine to parse the encapsulated packet to extract the tenant identifier and the plurality of attributes of the packet. Based on the extracted information and service profiles maintained by the service machine, the service machine determines a result for the packet. The service profiles may be initiated by a service manager implemented to configure the service machine. A service manager is a process that may be implemented in a separate virtual machine. Usually, there is one service manager per deployment. The result may be any of: drop the packet, allow the packet, or modify the packet. Once the result is determined, the service machine provides the result to the service insertion module.

Based on the received result, the service insertion module determines whether to forward the packet, drop the packet, or modify the packet. If the packet is to be forwarded, then the service insertion module forwards the packet toward the packet destination. If the packet is to be dropped, then the service insertion module drops the packet. If the packet is to be modified, then the service insertion module modifies the packet as instructed by the service machine or receives an already modified packet from the service machine.

The above described process implements tenant identifiers and uses the tenant identifiers to enable a single service machine to serve multiple tenants. The tenant identifiers are implemented in profile tables maintained by VNICs, rule tables maintained by hypervisors, and service profiles maintained by service machines. By implementing the tenant identifiers, multiple tenants may use the services provided by a single service machine.

BRIEF DESCRIPTION OF THE DRAWINGS

In the drawings:

FIG. 2C depicts example rule tables.

DETAILED DESCRIPTION

In the following description, for the purposes of explanation, numerous specific details are set forth in order to provide a thorough understanding of the method described herein. It will be apparent, however, that the present approach may be practiced without these specific details. In some instances, well-known structures and devices are shown in a block diagram form to avoid unnecessarily obscuring the present approach.

1. EXAMPLE PHYSICAL IMPLEMENTATIONS

Figure 1:
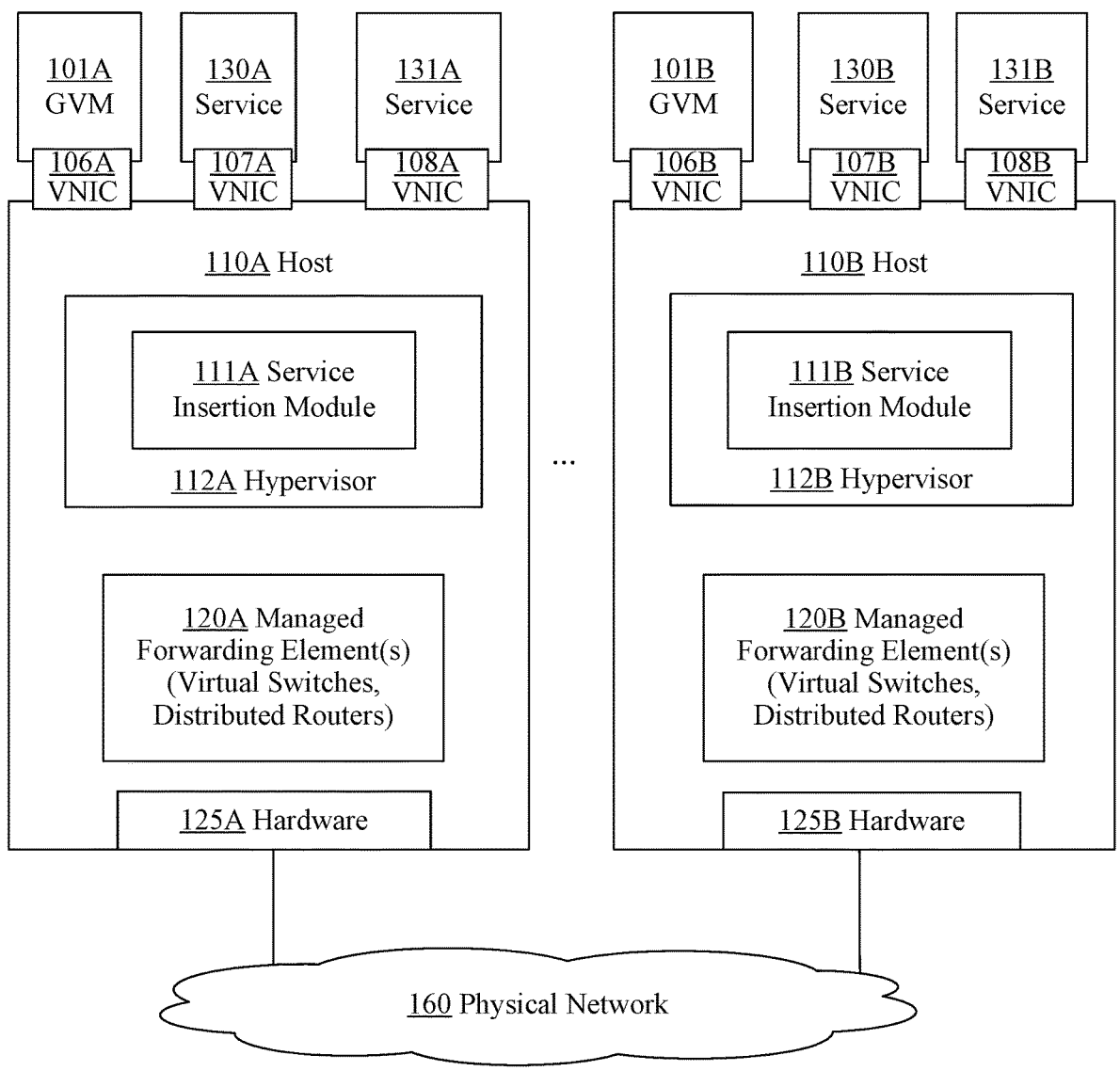
FIG. 1 is a block diagram depicting an example physical implementation view of an example logical network environment for implementing multitenancy for service machines.

FIG. 1 is a block diagram depicting an example physical implementation view of an example logical network environment for implementing multitenancy for service machines. In the depicted example, environment 10 includes one or more hosts 110A and 110B, and one or more physical networks 160. Environment 10 may include additional hosts and additional networks not depicted in FIG. 1.

Hosts 110A-110B may be configured to implement virtual machines ("VMs"), edge service gateways, logical routers, logical switches, and the like. Hosts 110A-110B are also referred to as computing devices, host computers, host devices, physical servers, server systems, or physical machines.

In the example depicted in FIG. 1, host 110A is configured to support a guest virtual machine GVM 101A, and service virtual machines SVMs 130A-131A; while host 110B is configured to support a guest virtual machine GVM 101B, and service virtual machines SVMs 130B-131B. Packets are transmitted to and from machines 101A, 130A-131A, 101B, and 130B-131B via virtual network interfaces ("VNICs") 106A, 107A, 108A, 106B, 107B, and 108B, respectively. VNICs comprise software for emulating hardware network interfaces for transferring network packets between the virtual machines and associated hypervisors 112A, 112B. The hosts may support additional guest machines, additional service machines, as well as physical appliances and gateways.

Guest virtual machines GVM 101A-101B are examples of virtualized computing instances or workloads. A virtualized computing instance may represent an addressable data compute node or an isolated user space instance.

SVMs 130A-131A and 130B-131B are virtual machines configured to provide services to packets of data flows. Examples of services include firewall services ("FS"), intrusion detection services ("IDS"), intrusion prevention services ("IPS"), and other services that may be performed on packets, such as NAT services, DHCP services, site-to-site VPN services, L2 VPN services, load balancing services, and the like.

In an embodiment, hosts 110A-110B are configured to support execution of hypervisors 112A-112B and execution of managed forwarding elements 120A-120B, respectively. Hypervisors 112A-112B are software layers or components that support the execution of machines 101A, 130A-132A, 101B, and 130B-132B. Hypervisors 112A-112B may be configured to implement virtual switches and forwarding tables that facilitate data traffic between the virtual machines. In certain embodiments, virtual switches and other hypervisor components may reside in a privileged virtual machine (not shown) sometimes referred to as a "Domain Zero" or a "root partition" (not shown). Hypervisors 112A-112B may also maintain mappings between underlying hardware 125A-125B and virtual resources allocated to the respective VMs. Hardware components 125A-125B may include one or more processors, one or more memory units, one or more physical network interface cards, and one or more storage devices.

Hypervisors 112A-112B may be configured to support execution of service insertion modules 111A-111B configured to implement the multitenancy for service machines, such as SVMs 130A-131A and 130B-131B, respectively. Service insertion modules 111A-111B are described in FIG. 2A-2B.

Managed forwarding elements 120A-120B may be configured to perform forwarding of packets communicated to and from machines 101A, 130A-131A, 101B, and 130B-131B. Managed forwarding elements 120A and 120B may collectively implement one or more logical switches and logical routers for overlay networks. Logical switches and routers may be implemented by virtual switches and routers, which may be distributed across multiple hosts.

2. MULTITENANCY FOR SERVICE MACHINES 2.1. Example Logical Network Environment

Figure 2A:
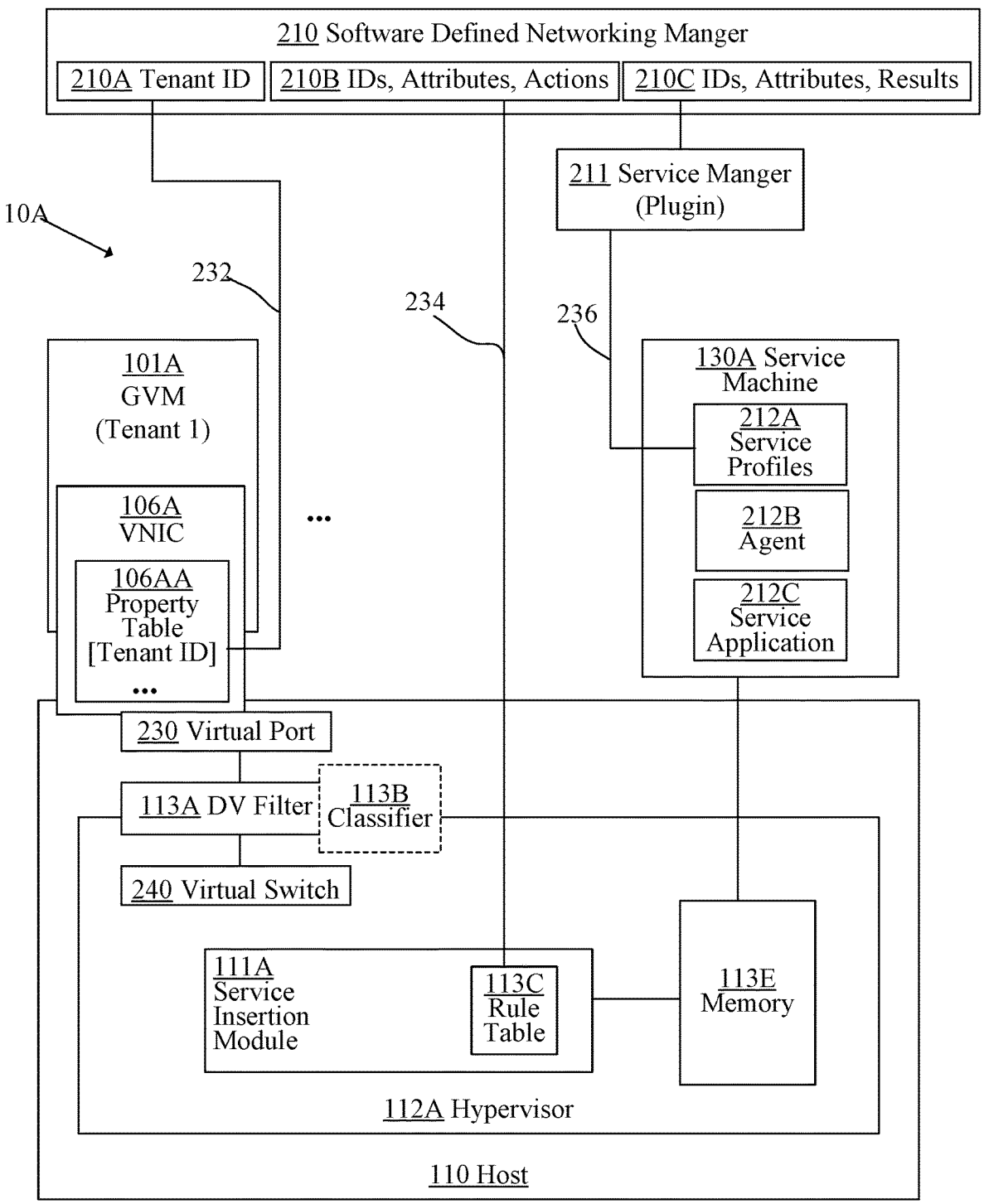
FIG. 2A is a block diagram depicting an example logical network environment for implementing multitenancy for service machines.

FIG. 2A is a block diagram depicting an example logical network environment for implementing multitenancy for service machines. In the depicted example, it is assumed that a logical network 10A supports one or more guest virtual machines, such as GVM 101A, that GVM 101A belongs to a particular tenant, and that logical network 10A supports at least one service machine, such as SM 130A. It is further assumed, that packets from GVM 101A are detected by VNIC 106A, provided to a virtual port 230, provided to distributed virtual ("DV") filter 113A, and then provided to a virtual switch 240. DV filter 113A may be placed at any point between VNIC 106A and virtual switch 240, as shown in FIG. 2A. However, in some embodiments, DV filter 113A may be implemented in VNIC 106A or in virtual port 230.

In some embodiments, DV filter 113A comprises or calls a classifier 113B that is configured to classify the packets received from virtual machines. In other embodiments, classifier 113B is implemented by virtual switch 240, or another module of hypervisor 112A.

Multitenancy for service machines may be implemented for service virtual machines as well as for physical appliances. Each of the machines or appliances may implement one or more service profiles 212A, an agent 212B, and a service application 212C. Service profiles 212A usually store rules for servicing packets. Service application 212C provides services. Agent 212B manages service profiles 212A and service application 212C.

If a service machine is service virtual machine 130A, as described in FIG. 1 and shown in FIG. 2A, then, upon determining that a packet requires a service from service virtual machine 130A, service insertion module 111A may use a shared memory mechanism to pass the packet to the service virtual machine. In this case, service insertion module 11A stores the packet in shared memory 113E, which may be shared between service virtual machine 130A and other service virtual machines (not shown). Service virtual machine 130A may detect the packet in shared memory 113E, apply one or more services to the packet, and return a result of the servicing to shared memory 113A and/or notify service insertion module 111A.

However, if a service machine is a physical appliance (not depicted in FIG. 2A), then, upon determining that a packet requires a service from the physical appliance, service insertion module 111A may redirect the packet to a physical switch (not shown), and the physical switch may forward the packet to the physical appliance. The physical appliance may detect the packet, apply one or more services to the packet, and transmit a result of the servicing to the physical switch, which may forward the result to service insertion module 111A.

SDN manager 210 provides configuration data to host 110 for populating property table 106A in GVM 101A, rule table 113C in service insertion module 111A, and service machine 130A. Although not illustrated, intermediate components may be used to distribute configuration data to host 110, other hosts, and service machines. For example, a central control plane comprising a cluster of controller servers (not shown) may receive configuration information from manager 210 and direct the configuration data to a local controller, i.e., an agent (not shown) in hypervisor 112A, which then populates property table 106AA, Rule table 113C, and service profiles 212A according to the configuration data. In an embodiment, SDN manager 210 provides data for enabling multitenancy for service machines. For example, SDN manager 210 may provide data 232 to VNIC 106A to allow VNIC 106A to generate a property table 106AA. Property table 106AA may be implemented as a data structure that is used to store a tenant identifier of a tenant that owns or controls GVM 101A. Since a guest machine is usually owned by one tenant, data 232 includes one tenant identifier, and property table 106AA of GVM 101A is used to store one tenant identifier. If logical network 10A supports several guest virtual machines (not shown) and the guest virtual machines belong to different tenants, then the property tables of the guest virtual machines will be provided with unique tenant identifiers of the corresponding tenants.

SDN manager 210 may provide data 234 to service insertion module 111A to allow service insertion module 111A to generate a rule table 113C. Data 234 may include associations between tenant identifiers, packet attributes and actions. Rule table 113C may include rules for all tenants that transmit their packets to hypervisor 112A. Organizations of rule tables 113C may vary and may depend on the type of indexing used in rule tables 113C. Examples of rule tables 113C are described in FIG. 2C.

SDN manager 210 may provide data 236 to a service manager 211, which may be implemented as a software plugin configured to manage one or more service machines, such as service machine 130A. Service manager 211 may forward data 236 to service machine 130A to allow service machine 130A to use data 236 to generate one or more service profiles 212A. Data 236 may include rules that define mappings between tenant identifiers, packet attributes and results. The rules may include firewall rules, IDS rules, IPS rules, and the like. Usually, service machine 130A stores one service profile per tenant. Hence, if service machine 130A provides services to several tenants, then service machine 130A may generate and store several service profiles 212A.

2.2. Example Flow Chart

Figure 2B:
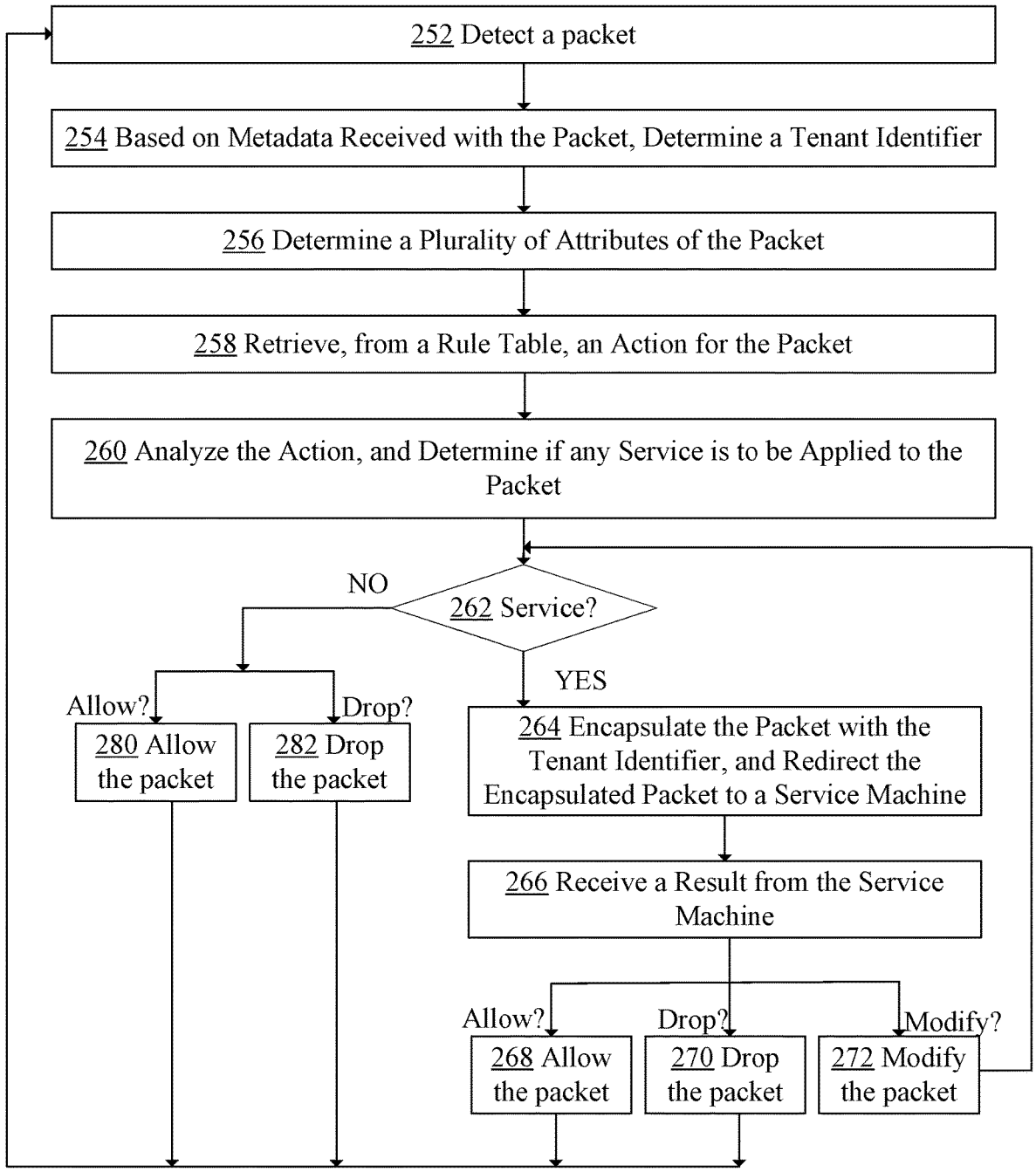
FIG. 2B is an example flow chart for implementing multitenancy by a service insertion module.

FIG. 2B is an example flow chart for implementing multitenancy for service machines. The steps described in FIG. 2B may be performed by service insertion module 111A, or any other component of hypervisor 112A programmed to do so. For the purpose of describing FIG. 2B, it is assumed that property table 106AA, rule table 113C and service profiles 212A have been already generated and stored.

In step 252, a service insertion module implemented in a hypervisor detects a packet. Service insertion module 111A may detect the packet received by, for example, virtual switch 240 or DV filter 113A. The packet is usually sent with metadata that was added by, for example, DV filter 113A. The metadata may include a tenant identifier extracted from property table 106AA. For example, upon detecting the packet, DV filter 113A or classifier 113B, determines that the packet was received by VNIC 106A. Then DV filter 113A or classifier 113B accesses property table 106AA to extract the tenant identifier from the table, includes the tenant identifier in the metadata, and attaches the metadata to the packet.

In step 254, the service insertion module determines, based on the metadata received along with the packet, the tenant identifier of a tenant that sent the packet. This may include parsing the received metadata and extracting the tenant identifier from the parsed metadata.

In step 256, the service insertion module determines a plurality of attributes of the packet by, for example, parsing the packet. The plurality of attributes of the packet may include a source address, a destination address, and a protocol identifier.

In step 258, the service insertion module retrieves an action for the packet from a rule table. For example, service insertion module 111A may use the tenant identifier and the plurality of attributes of the packet as indexes to lookup rule table 113C to find a match between the tenant identifier and at least some of the attributes for the packet, and the rules stored in rule table 113C. If the match is found, then a corresponding action may be retrieved from rule table 113C. Examples of actions include "forward the packet to a service machine to provide a service," "allow," and "drop." Examples of rule tables 113C are described in FIG. 2C.

In step 260, the service insertion module analyzes the action, and determines, based on the action, whether at least one service is to be applied to the packet.

If, in step 262, the service insertion module determines that at least one service is to be applied to the packet, then, in step 264, the service insertion module determines a service machine that is configured to provide the service to the packet. In this step, the service insertion module makes a copy of the packet and stores the copy of the packet. Furthermore, the service insertion module generates an encapsulated packet by encapsulating the packet with the tenant identifier and redirects the encapsulated packet to the service machine.

In an embodiment, upon receiving the encapsulated packet, which is encapsulated with the tenant identifier, service machine 130A may use the tenant identifier and one or more attributes of the packet to determine a result for the packet. Examples of the results include drop, allow, and modify.

In step 266, the service insertion module receives the result from the service machine that provided the service to the packet. The result may indicate that the packet is to be allowed, dropped, or modified.

If the result indicates that the packet is to be allowed, then, in step 268, the packet is allowed and routed toward its destination.

If the result indicates that the packet is to be dropped, then, in step 270, the packet is dropped.

If the result indicates that the packet is to be modified, then, in step 272, the packet is modified according to modification instructions provided by the service machine to generate a modified packet. Alternatively, the service insertion module receives, from the service machine, an already modified packet, and therefore, the step 272 may be omitted. Either way, the service insertion module may then proceed to step 262 to test whether any additional service is required for the modified packet.

However, if in step 262, the service insertion module determines that no service for the packet, or no additional service for the modified packet, is required, then the service insertion module determines whether the packet should be allowed or dropped. As described before, the service insertion module made a copy of the packet, stored the copy of the packet, and kept the copy while an encapsulated packet was sent to the service machine. The service machine analyzed the packet and determined what to do with the packet. If the service machine determines that the packet can be allowed, then the code for "allow" is sent back to the service insertion module, so that the service insertion module forwards its own copy of the packet to its destination, and the service machine deletes (or overwrites) its own copy.

If the service insertion module determines that the packet is to be allowed, then, in step 280, the service insertion module receives the "allow" code, and the service insertion module forwards its own copy of the packet to the packet's destination, and the service machine deletes (or overwrites) its own copy.

If the service insertion module determines that the packet is to be dropped, then, in step 282, the service insertion module receives the "drop" code, and the service insertion module deletes its own copy of the packet, and the service machine deletes its own copy.

Upon completing any of the steps 268, 270, 280 or 282, the service insertion module proceeds to awaiting a new packet in step 252.

3. EXAMPLE RULE TABLE

FIG. 2C depicts example rule tables 270 and 290. An example rule table 270 is a data structure that includes rules organized using tenant identifiers as a primary index and using attributes of packets as a secondary index. Therefore, the rules stored in example rule table 270 are grouped per tenant identifiers, and then grouped by attributes of packets. For example, for a tenant identifier 272, example rule table 270 includes rules 273, 274, and so forth, while for a tenant identifier 276, example rule table 270 includes rules 277, 278, and so forth. Each rule includes an action. Examples of actions include "forward to a service machine," "allow," and "drop".

An example rule table 290 is a data structure that includes rules organized using attributes of packets and tenant identifiers as indexes. Therefore, the rules stored in example rule table 290 are not grouped per tenant identifiers, but rather by combinations of attributes and tenant identifiers. Rule table 290 may include, for example, rules, 292, 293, 294, 295, and so forth. Each rule includes an action that may be "forward to a service machine," "allow," or "drop".

4. EXAMPLE SERVICE

Figure 3:
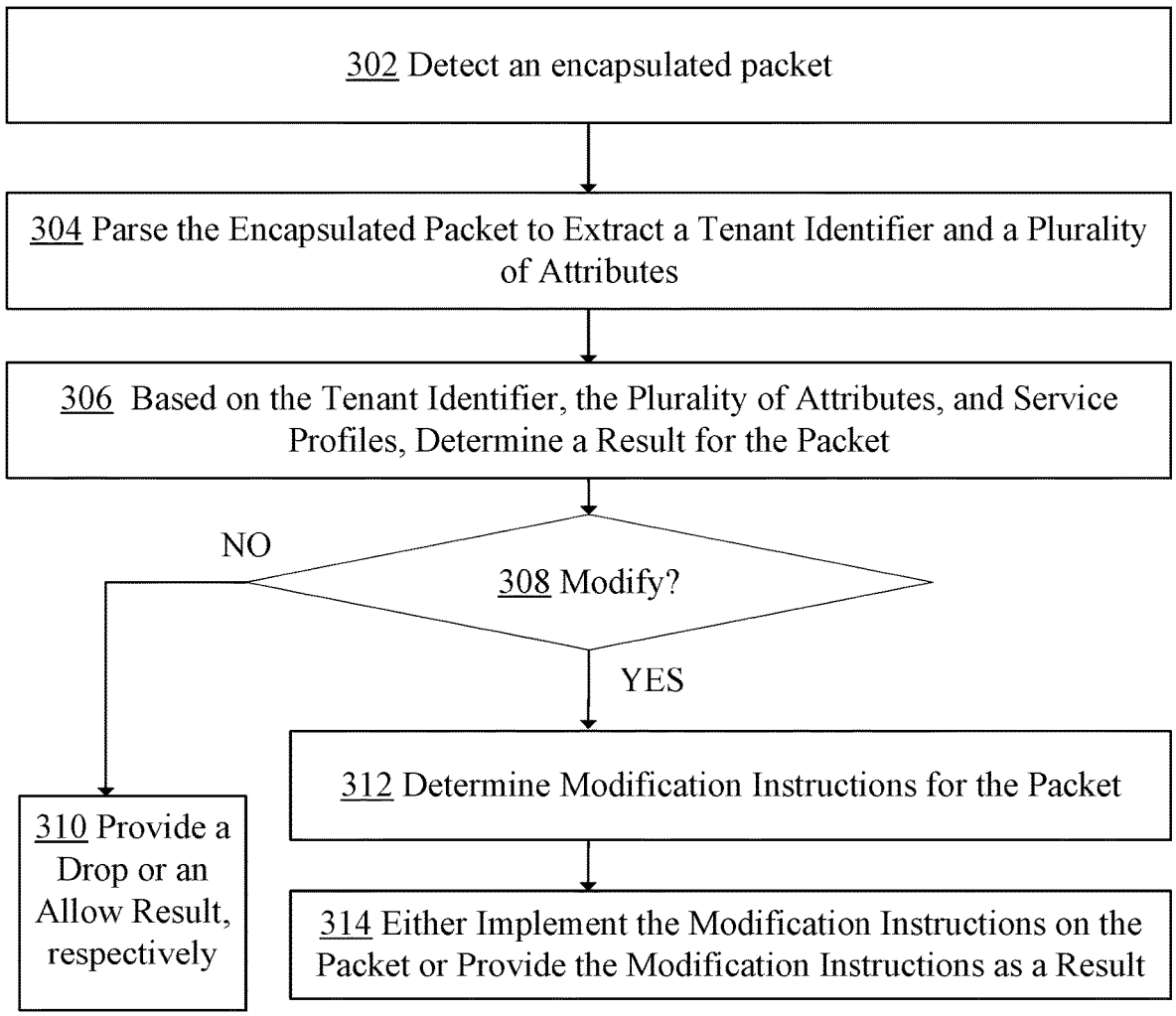
FIG. 3 is an example flow chart for implementing multitenancy by a service machine.

FIG. 3 is an example flow chart for implementing multitenancy by a service machine. The depicted flow chart depicts steps that are performed by a service machine such as service virtual machine 130A described in FIG. 2A, or a physical appliance (not shown). It is also assumed that the service machine has received, or otherwise detected, an encapsulated packet that has been encapsulated with a tenant identifier. The encapsulated packet also includes a plurality of attributes, such as a source IP address, a source port number, a destination IP address, a destination port number, and a protocol identifier.

In step 302, a service machine detects an encapsulated packet. As described above, the encapsulated packet is encapsulated with a tenant identifier of a tenant that sent the packet.

In step 304, the service machine parses the encapsulated packet, and extracts, from the parsed packet, the tenant identifier and a plurality of attributes of the packet.

In step 306, the service machine determines a result for the packet by determining whether service profiles that are configured on the service machine include an entry for the tenant identifier and one or more attributes from the plurality of attributes of the packet. Organizations of the service profiles maintained by the service machine may vary and may depend on the implementation of the service machine. In one implementations, the service profiles are organized by tenant identifiers as a primary index, and by attributes of packets as a secondary index. In this implementation, the service profiles may be organized similarly to the per-tenant rule table 270, depicted in FIG. 2C. This example should not be considered, however, as limiting in any way as the service profiles may be organized in many ways.

In step 308, the service machine tests whether the result determined in step 306 indicates that the packet is to be modified. If the packet is to be modified, then the service machine proceeds to performing step 312; otherwise, the service machine proceeds to performing step 310.

In step 310, the service machine determines whether the packet is to be dropped or allowed. If the packet is to be dropped, then the service machine provides a "drop" result to a service insertion module. If the packet is to be allowed, then the service machine provides an "allow" result to the service insertion module.

However, if the service machine determines, in step 308, that the packet is to be modified, then, the service machine may determine modification instructions for the packet. The modification instructions may indicate that, for example, a header of the packet is to be modified to change the current destination IP address of the packet to another destination IP address for the packet.

Once the modification instructions are determined, then, depending on the implementation, the service machine may, in step 314, either implement itself the modification on the packet or provide the modification instructions to the service insertion module.

If the service machine implements the modification instructions on the packet, then the service machine may generate a modified packet by applying the modification instructions to the packet, and then providing the modified packet to the service insertion module.

However, if the service machine does not implement the modification instructions itself, then the service machine provides the modification instructions to the service machine, and the service machine modifies the packet according to the modification instructions.

5. IMPROVEMENTS PROVIDED BY CERTAIN EMBODIMENTS

In an embodiment, an approach presented herein provides mechanisms for enabling multitenancy for service machines in virtualized computer networks. The techniques allow a single service machine to serve a plurality of tenants, and thus, overcome the shortcomings of other approaches in which a single service machine may provide services only to one tenant. The presented techniques provide improvements in handling the multitenancy for various service machines, including service virtual machines and physical appliances.

In an embodiment, an approach presented herein requires relatively small modifications to the communications protocol used by a hypervisor to direct packets to service machines, and relatively small modifications to the communications protocol used by the service machines to provide services to packets. The modifications are based on including tenant identifiers that uniquely identify the tenants that transmit the packets, and that uniquely identify the rules that are specific to the tenants. Implementing the tenant-based modifications on the hypervisors and the tenant-based modifications on the service machines provides enormous benefits in terms of scalability of the virtualized computer networks and expandability of service machines to provide services to multiple tenants.

6. IMPLEMENTATION MECHANISMS

The present approach may be implemented using a computing system comprising one or more processors and memory. The one or more processors and memory may be provided by one or more hardware machines. A hardware machine includes a communications bus or other communication mechanisms for addressing main memory and for transferring data between and among the various components of hardware machine. The hardware machine also includes one or more processors coupled with the bus for processing information. The processor may be a microprocessor, a system on a chip (SoC), or other type of hardware processor.

Main memory may be a random-access memory (RAM) or other dynamic storage device. It may be coupled to a communications bus and used for storing information and software instructions to be executed by a processor. Main memory may also be used for storing temporary variables or other intermediate information during execution of software instructions to be executed by one or more processors.

7. GENERAL CONSIDERATIONS

Although some of various drawings may illustrate a number of logical stages in a particular order, stages that are not order dependent may be reordered and other stages may be combined or broken out. While some reordering or other groupings may be specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described regarding specific embodiments. However, the illustrative embodiments above are not intended to be exhaustive or to limit the scope of the claims to the precise forms disclosed. Many modifications and variations are possible in view of the above teachings. The embodiments were chosen to best explain the principles underlying the claims and their practical applications, to thereby enable others skilled in the art to best use the embodiments with various modifications as are suited to the uses contemplated.

Any definitions set forth herein for terms contained in the claims may govern the meaning of such terms as used in the claims. No limitation, element, property, feature, advantage or attribute that is not expressly recited in a claim should limit the scope of the claim in any way. The specification and drawings are to be regarded in an illustrative rather than a restrictive sense.

As used herein the terms "include" and "comprise" (and variations of those terms, such as "including," "includes," "comprising," "comprises," "comprised" and the like) are intended to be inclusive and are not intended to exclude further features, components, integers or steps.

References in this document to "an embodiment," indicate that the embodiment described or illustrated may include a particular feature, structure, or characteristic, but every embodiment may not necessarily include the particular feature, structure, or characteristic. Such phrases are not necessarily referring to the same embodiment. Further, when a particular feature, structure, or characteristic is described or illustrated in connection with an embodiment, it is believed to be within the knowledge of one skilled in the art to affect such feature, structure, or characteristic in connection with other embodiments whether or not explicitly indicated.

Various features of the disclosure have been described using process steps. The functionality/processing of a given process step could potentially be performed in diverse ways and by different systems or system modules. Furthermore, a given process step could be divided into multiple steps and/or multiple steps could be combined into a single step. Furthermore, the order of the steps can be changed without departing from the scope of the present disclosure.

It will be understood that the embodiments disclosed and defined in this specification extend to alternative combinations of the individual features and components mentioned or evident from the text or drawings. These different combinations constitute various alternative aspects of the embodiments.

What is claimed is:

1. A computer-implemented method for enabling a service virtual machine to provide one or more services for a plurality of tenants, the method comprising:
    detecting a packet by a service inserter implemented in a hypervisor that is a software layer that supports an execution of the service virtual machine;
    based on metadata received along with the packet, identifying, by the service inserter, a tenant identifier;
    determining, by the service inserter, a plurality of attributes of the packet;

based on the tenant identifier and the plurality of attributes of the packet, retrieving, by the service inserter, an action for the packet from a rule table;

based on the action, determining, by the service inserter, whether at least one service is to be applied to the packet;

in response to determining that the at least one service is to be applied to the packet:
    making, by the service inserter, a copy of the packet;
    storing the copy of the packet;
    generating, by the service inserter, an encapsulated packet by encapsulating the packet with the tenant identifier;
    directing, by the service inserter, the encapsulated packet to a service machine that is configured to provide the at least one service to the encapsulated packet;
    upon receiving, by the service inserter, a result from the service machine providing the at least one service to the encapsulated packet:
        determining, by the service inserter based on the result, whether to forward the encapsulated packet toward a packet destination or drop the encapsulated packet; and
        in response to determining that the encapsulated packet is to be forwarded toward the packet destination, deleting or overwriting the encapsulated packet and forwarding, by the service inserter, the copy of the packet toward the packet destination; and
        in response to determining that the encapsulated packet is to be dropped, deleting, by the service inserter, the copy of the packet and deleting or overwriting the encapsulated packet.

2. The computer-implemented method of claim 1, wherein the tenant identifier is determined based on a port identifier of a port on which the packet was received.

3. The computer-implemented method of claim 1, wherein the tenant identifier is identified based on a property table maintained by a virtual network interface card ("VNIC") that received the packet; and
    wherein metadata that includes the tenant identifier is added to the packet once the packet is detected in the hypervisor.

4. The computer-implemented method of claim 1, wherein the plurality of attributes of the packet comprises a source address, a destination address, and a protocol identifier;
    wherein the action for the packet is retrieved from a rule table maintained by the service inserter; and
    wherein the action for the packet indicates any of: forward the packet to the service machine, route/allow the packet, or drop the packet.

5. The computer-implemented method of claim 4, wherein redirecting the encapsulated packet to a service machine that is configured to provide the at least one service to the packet causes the service machine to perform:
    parsing the encapsulated packet to extract, from the encapsulated packet, the tenant identifier, the source address, the destination address, and the protocol identifier;
determining the result for the encapsulated packet based on the tenant identifier, the source address, the destination address, the protocol identifier, and based on service profiles maintained by the service machine; and
providing the result to the service inserter.

6. The computer-implemented method of claim 5, wherein a software defined networking ("SDN") manager provides data for generating a property table that includes the tenant identifier for packets detected by a virtual network interface card ("VNIC"), and that is maintained by the VNIC;
    wherein the SDN manager provides data for generating the rule table that includes actions to be performed on packets, that is indexed using a plurality of tenant identifiers and attributes of packets, and that is maintained by the service inserter; and
    wherein the SDN manager provides data for generating the service profiles that include rules for servicing packets, that are indexed using a plurality of tenant identifiers and attributes of the packets, and that are maintained by the service machine.

7. The computer-implemented method of claim 1, further comprising:
    in response to determining that no service is to be applied to the packet:
        determining whether the packet is to be dropped;
            in response to determining that the packet is not to be dropped, determining whether the packet is to be allowed; and
            in response to determining that the packet is to be allowed, routing the packet toward its destination.

8. One or more non-transitory computer-readable storage media storing one or more computer instructions which, when executed by one or more processors, cause the one or more processors to perform:
    detecting a packet by for a service inserter implemented in a hypervisor that is a software layer that supports an execution of a service machine providing one more services to a plurality of tenants;
    based on metadata received along with the packet, identifying, for the service inserter, a tenant identifier;
    determining, for the service inserter, a plurality of attributes of the packet;
    based on the tenant identifier and the plurality of attributes of the packet, retrieving, for the service inserter, an action for the packet from a rule table;
    based on the action, determining, for the service inserter, whether at least one service is to be applied to the packet;
    in response to determining that the at least one service is to be applied to the packet:
        making, by the service inserter, a copy of the packet;
        storing the copy of the packet;
        generating, for the service inserter, an encapsulated packet by encapsulating the packet with the tenant identifier;
        directing, by the service inserter, the encapsulated packet to a service machine that is configured to provide the at least one service to the encapsulated packet;
        upon receiving, for the service inserter, a result from the service machine providing the at least one service to the encapsulated packet:
            determining, for the service inserter based on the result, whether to forward the encapsulated packet toward a packet destination or drop the encapsulated packet; and
            in response to determining that the encapsulated packet is to be forwarded toward the packet destination, deleting or overwriting the encapsulated packet and forwarding, for the service inserter, the copy of the packet toward the packet destination; and in response to determining that the encapsulated packet is to be dropped, deleting or overwriting the encapsulated packet and deleting, by the service inserter, the copy of the packet.

9. The one or more non-transitory computer-readable storage media of claim 8, wherein the tenant identifier is determined based on a port identifier of a port on which the packet was received.

10. The one or more non-transitory computer-readable storage media of claim 8, wherein the tenant identifier is identified based on a property table maintained by a virtual network interface card ("VNIC") that received the packet; and wherein metadata that includes the tenant identifier is added to the packet once the packet is detected in the hypervisor.

11. The one or more non-transitory computer-readable storage media of claim 8, wherein the plurality of attributes of the packet comprises a source address, a destination address, and a protocol identifier;

wherein the action for the packet is retrieved from a rule table maintained by the service inserter; and wherein the action for the packet indicates any of: forward the packet to the service machine, route/allow the packet, or drop the packet.

12. The one or more non-transitory computer-readable storage media of claim 11, storing additional instructions which, when executed by the one or more processors, causing the service machine to perform:

parsing the encapsulated packet to extract, from the encapsulated packet, the tenant identifier, the source address, the destination address, and the protocol identifier;

determining the result for the encapsulated packet based on the tenant identifier, the source address, the destination address, the protocol identifier, and based on service profiles maintained by the service machine; and providing the result to the service inserter.

13. The one or more non-transitory computer-readable storage media of claim 12, wherein a software defined networking ("SDN") manager provides data for generating a property table that includes the tenant identifier for packets detected by a virtual network interface card ("VNIC"), and that is maintained by the VNIC;

wherein the SDN manager provides data for generating the rule table that includes actions to be performed on packets, that is indexed using a plurality of tenant identifiers and attributes of packets, and that is maintained by the service inserter; and wherein the SDN manager provides data for generating the service profiles that include rules for servicing packets, that are indexed using a plurality of tenant identifiers and attributes of the packets, and that are maintained by the service machine.

14. The one or more non-transitory computer-readable storage media of claim 8, storing additional instructions which, when executed by the one or more processors, cause the one or more processors to perform:

in response to determining that no service is to be applied to the packet:

determining whether the packet is to be dropped;

in response to determining that the packet is not to be dropped, determining whether the packet is to be allowed; and in response to determining that the packet is to be allowed, routing the packet toward its destination.

15. A hypervisor in a host computer configured to implement multitenancy by maintaining mappings between underlying hardware on the host computer and virtual resources allocated to a service machine that provides one or more services to a plurality of tenants, the hypervisor comprising a memory encoded computer instructions causing one or more processors to perform the following operations:

detecting a packet implemented in the hypervisor;

based on metadata received along with the packet, identifying a tenant identifier;

determining a plurality of attributes of the packet;

based on the tenant identifier and the plurality of attributes of the packet, retrieving an action for the packet from a rule table;

based on the action, determining whether at least one service is to be applied to the packet;

in response to determining that the at least one service is to be applied to the packet:

making a copy of the packet;

storing the copy of the packet;

generating an encapsulated packet by encapsulating the packet with the tenant identifier;

directing the encapsulated packet to a service machine that is configured to provide the at least one service to the encapsulated packet;

upon receiving a result from the service machine providing the at least one service to the encapsulated packet:

determining, based on the result, whether to forward the encapsulated packet toward a packet destination or drop the encapsulated packet; and in response to determining that the encapsulated packet is to be forwarded toward the packet destination, deleting or overwriting the encapsulated packet and forwarding the copy of the packet toward the packet destination; or in response to determining that the encapsulated packet is to be dropped, deleting or overwriting the encapsulated packet and deleting the copy of the packet.

16. The hypervisor of claim 15, wherein the tenant identifier is determined based on a port identifier of a port on which the packet was received.

17. The hypervisor of claim 15, wherein the tenant identifier is identified based on a property table maintained by a virtual network interface card ("VNIC") that received the packet; and wherein metadata that includes the tenant identifier is added to the packet once the packet is detected in the hypervisor.

18. The hypervisor of claim 15, wherein the plurality of attributes of the packet comprises a source address, a destination address, and a protocol identifier;

wherein the action for the packet is retrieved from a rule table maintained by the service inserter; and wherein the action for the packet indicates any of: forward the packet to the service machine, route/allow the packet, or drop the packet.

19. The hypervisor of claim 18, storing additional instructions which, when executed by the one or more processors, cause the one or more processors to perform:

causing the service machine to perform:

parsing the encapsulated packet to extract, from the encapsulated packet, the tenant identifier, the source address, the destination address, and the protocol identifier;

determining the result for the encapsulated packet based on the tenant identifier, the source address, the destination address, the protocol identifier, and based on service profiles maintained by the service machine; and providing the result to the service inserter.

20. The hypervisor of claim 19, wherein a software defined networking ("SDN") manager provides data for generating a property table that includes the tenant identifier for packets detected by a virtual network interface card ("VNIC"), and that is maintained by the VNIC;

wherein the SDN manager provides data for generating the rule table that includes actions to be performed on packets, that is indexed using a plurality of tenant identifiers and attributes of packets, and that is maintained by the service inserter; and wherein the SDN manager provides data for generating the service profiles that include rules for servicing packets, that are indexed using a plurality of tenant identifiers and attributes of the packets, and that are maintained by the service machine.

* * * * *